United States Patent

Bulka et al.

[11] Patent Number: 4,483,526
[45] Date of Patent: Nov. 20, 1984

[54] TURNING CONVEYOR AND SELECTED BOOK SIGNATURE TURNING METHOD

[75] Inventors: Raymond A. Bulka, Oak Lawn, Ill.; George D. Higgins, Kansas City, Mo.; William B. McCain, Hinsdale, Ill.

[73] Assignee: McCain Manufacturing Corporation, Chicago, Ill.

[21] Appl. No.: 421,380

[22] Filed: Sep. 22, 1982

Related U.S. Application Data

[63] Continuation of Ser. No. 294,809, Aug. 20, 1981, abandoned, which is a continuation of Ser. No. 116,942, Jan. 30, 1980, abandoned.

[51] Int. Cl.³ .............................................. B65H 39/02
[52] U.S. Cl. .................................... 270/54; 198/644; 198/617; 198/377
[58] Field of Search ................... 270/54; 198/374, 377, 198/422, 644, 617; 414/31

[56] References Cited

U.S. PATENT DOCUMENTS

| | | | |
|---|---|---|---|
| 3,215,250 | 11/1965 | Schubert | 198/377 |
| 3,269,516 | 8/1966 | Lucas | 198/377 |
| 3,390,508 | 7/1968 | Heimlicher | 198/422 X |
| 3,587,824 | 6/1971 | Rochla | 198/377 |
| 3,809,214 | 5/1974 | Reist | 198/374 |
| 4,066,162 | 1/1978 | Miaskoff | 198/377 |
| 4,155,133 | 5/1979 | Timson | 198/374 X |
| 4,283,973 | 8/1981 | Spencer | 198/377 X |

Primary Examiner—E. H. Eickholt
Attorney, Agent, or Firm—Kinzer, Plyer, Dorn & McEachran

[57] ABSTRACT

In a system for collating, binding and stacking magazines or books, a machine comprising a portion of a conveyor line used in the system. The machine turns some of the books relative to their direction of travel prior to entering the stacking device so that an even stack can be obtained. The books are turned slowly, that is, for a time interval of several book cycles.

7 Claims, 7 Drawing Figures

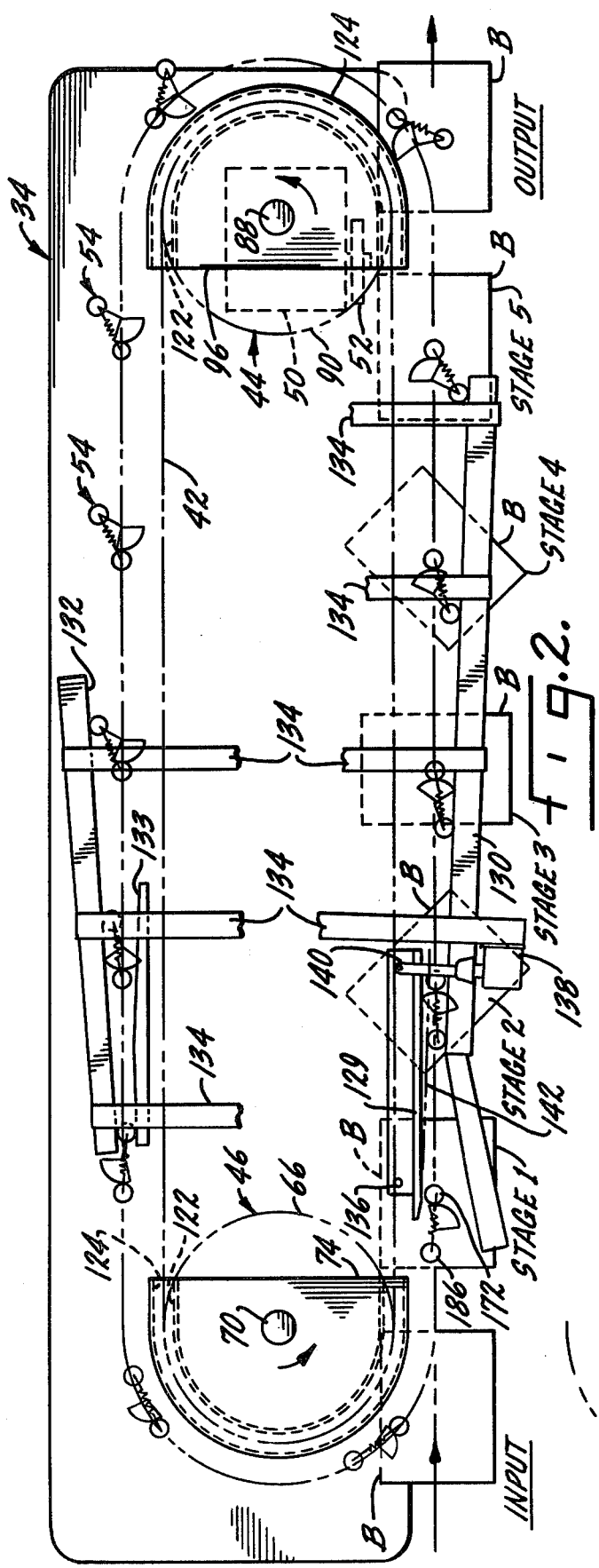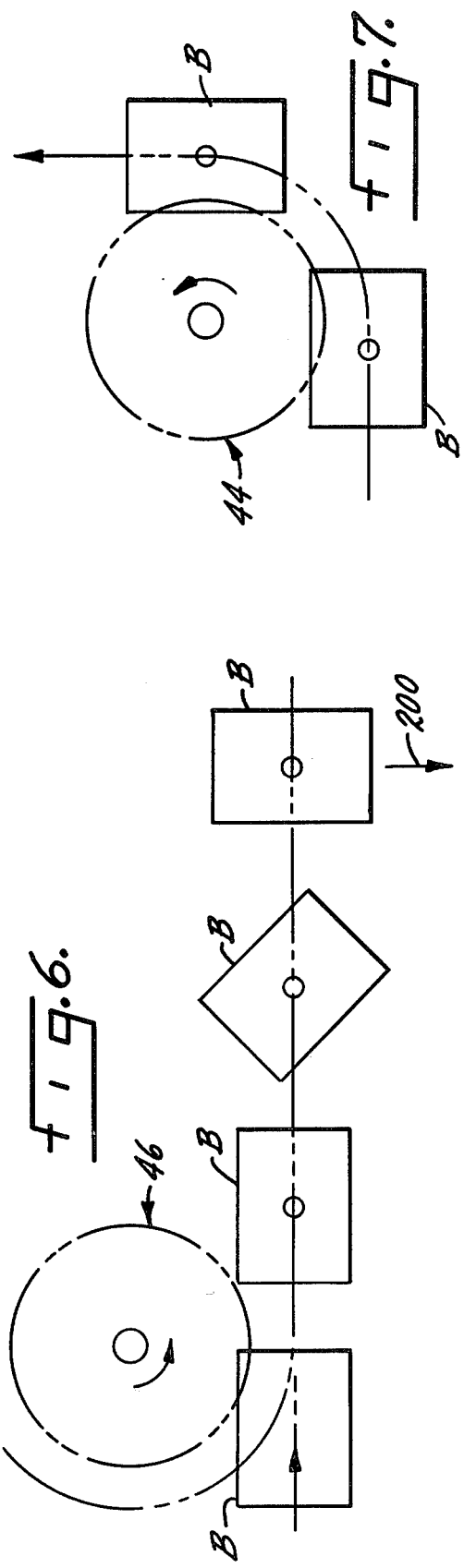

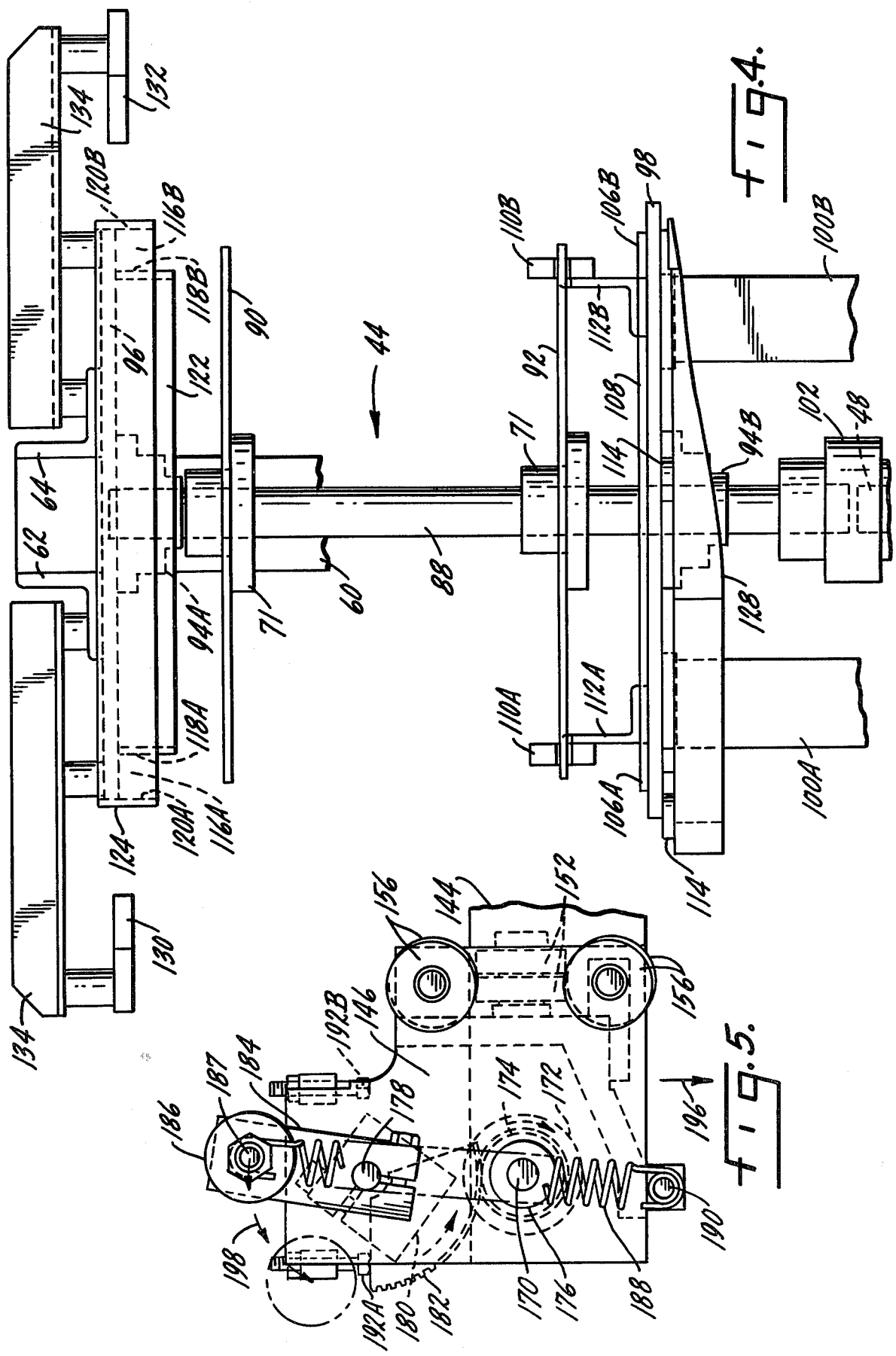

TURNING CONVEYOR AND SELECTED BOOK SIGNATURE TURNING METHOD

This is a continuation of application Ser. No. 294,809 filed Aug. 20, 1981, which is a continuation of Ser. No. 116,942, filed Jan. 30, 1980, both now abandoned.

SUMMARY OF THE INVENTION

This invention relates to signature gathering systems in which successive signatures are fed to and collected into a book on a conveyor.

Books, including magazines, are composed of signatures which are simply folded sheets bearing the printed matter. The different signatures required for a book are fed from corresponding hoppers or so-called pockets. The signatures are collected one atop another, or one aside another as the case may be, on a conveyor line and transported to a station in the system where the signatures are joined into a book by stitching (as by staples) or by gluing, depending on how the book is bound. The bound books are trimmed to a uniform size. Further processing may include inserting cards or attaching mailing labels to books. The completed books are then fed to a stacking device which counts them and gathers them in stacks for shipment.

In the binding procedure known as saddle-binding, the signatures are fed by dropping each successive signature onto a conveyor such that a signature straddles the preceding signatures. The folds of the signatures collect one atop another and form the backbone of the book. The top edge of the book is referred to as the head and the bottom edge is called the foot, with the open side edge being called the lap of the book.

One problem with saddle-bound books is after they have been stitched the backbone of the book will be somewhat thicker than the lap edge. The effect of the slight unevenness in a saddle-bound book is magnified when the books are stacked for shipment. If all of the backbones are collected on the same side of the stack, the books tend to slide off the top of the stack, making it difficult to keep the stack straight and even. Alternating the backbone orientation is required to obtain a manageable stack.

Presently known devices for arranging saddle-bound books in a stack with the backbones on alternate sides include the so-called rotatable stackers. These devices receive a certain number of books in a bin or tray and then rotate the entire bin 180° before the next book is placed on top of the stack. Then a similar number of books are placed on the stack and it is rotated again. So, for example, five books will be fed onto a stack and before the sixth one can be added the first five are turned 180°. The difficulty with this technique is that it requires the turning operation to be completed in the time between the fifth and sixth books being placed on the stack. While this can be accomplished at low production rates, the production rates of modern highspeed systems have foreshortened the time interval available for rotating the stack. If the time interval between successive books reaching a given point in the system is defined as a book cycle, the rotatable stacker must accomplish its rotation in one book cycle. The high speed machines in use today have such a short book cycle that the rotatable stacker cannot be reliably rotated on time. Also the high impact needed to rotate a stack of books tends to damage them.

Another approach to the problem of obtaining alternate backbone orientation has been the use of pegs or lugs which engage a corner of the book while the conveyor continues to move forward. This method leads to book damage at the high speeds presently being used. In another prior device the books are arranged to come off the conveyor with the backbone perpendicular to the direction of travel. Some of the books are then dropped onto the stack while others are carried over the top of the stack, turned over and then dropped back on to the stack from the opposite side. This results in an even stack but some of the magazines are upside down. This creates problems with the placement of mailing labels on opposite sides of the books.

The present invention is directed to a machine, forming part of the system conveyor line, for changing the orientation of the backbones prior to the books entering a stacking device. A stacking bin or tray remains stationary because the books are turned beforehand so that the backbones have been positioned as needed to build an even pile or stack. The machine includes carrier stations or flights attached to an endless conveyor. Each carrier station has clamp means and turning means which rotate the clamp means. The books are fed into the machine at an input area where a clamp means positively engage a book to carry it toward a discharge area of the turning conveyor. While the books are being carried the turning means rotates the books, thereby changing the orientation of the book. The turning occurs over a time interval of several book cycles so that the book is not subjected to any shock loading which could damage it.

BRIEF DESCRIPTION OF THE DRAWINGS

FIG. 2 is a diagrammatic plan view of a turning conveyor according to the present invention, FIG. 4 is an end elevation view of a head end pulley, FIG. 5 is a top plan view of an enlarged scale of a carrier station, taken along line 5—5 of FIG. 3, FIG. 6 is a diagrammatic plan view of an alternate arrangement of book travel direction; and FIG. 7 is a diagrammatic plan view of a further alternate arrangement for book travel direction.

DETAILED DESCRIPTION OF THE INVENTION

Figure 1:
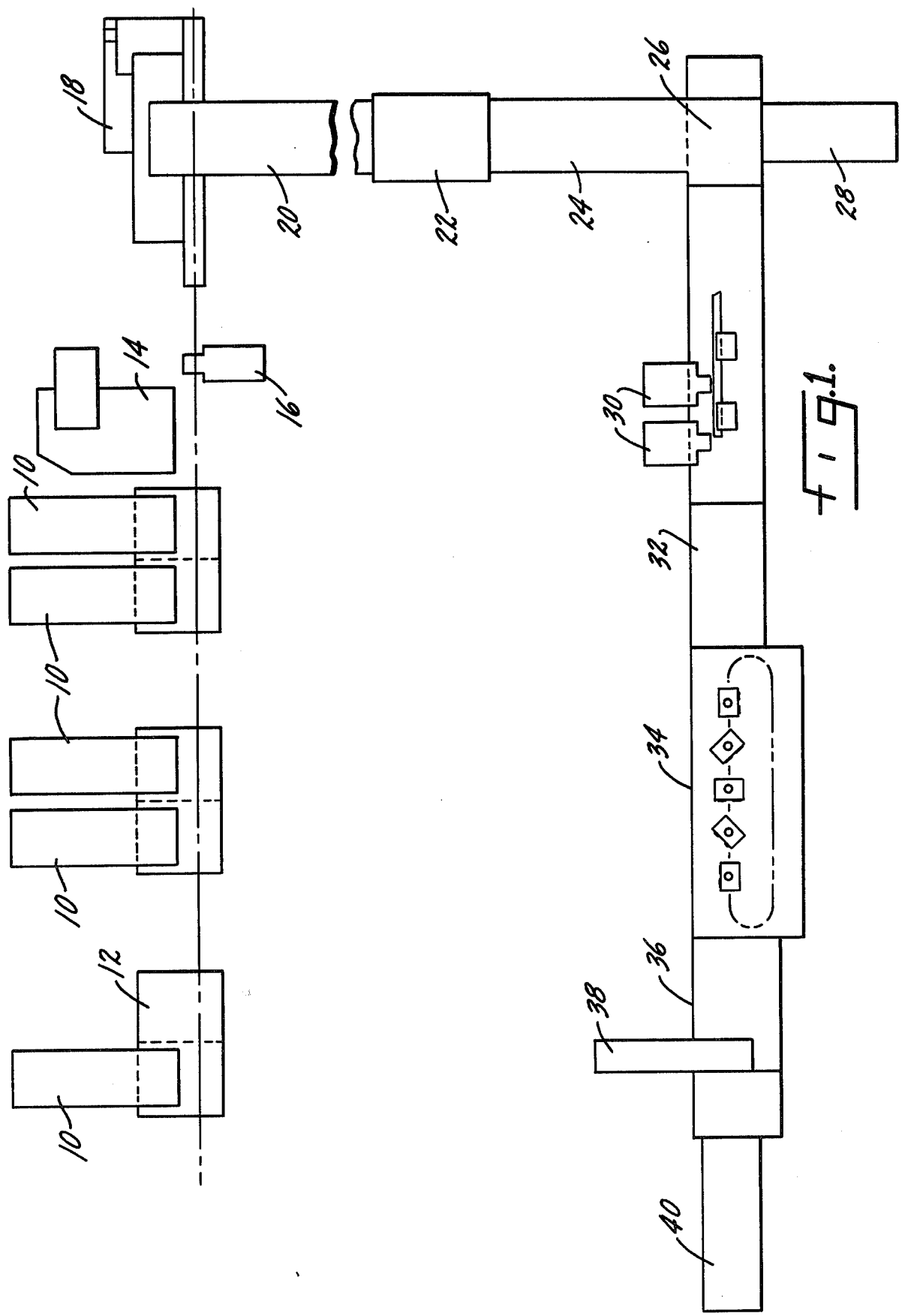
FIG. 1 is a diagrammatic plan view of an entire system for preparing books.

FIG. 1 shows a layout of an entire system for gathering stitching and stacking books. A typical system might include a plurality of signature feeders 10, and card feeder 12, all driven by a main drive 14. A caliper 16 measures the thickness of books to assure that signatures have neither been duplicated nor omitted. A stitcher 18 binds the books as by stapling. A book accelerator-collector 20 stacks two books together so they may be trimmed at the same time by the trimmer 22. An unstacker 24 feeds the books to a mailing transfer 26 where some of the books are taken out of line to a bypass conveyor 28. The remainder of the books continue down the conveyor line past card inserters 30 to a mailing table 32. Address labels or the like are applied at this location. A turning conveyor according to the present invention is shown at 34. A series of books are shown in various stages of progression through the turning conveyor. The books are discharged to a stacking device 36 which may include means for counting the number of books on a pile or stack. A diversion conveyor 38 may be provided for removing the last few books addressed to a particular mailing code when there are not enough of these remaining to form a new complete stack. A loading conveyor 40 completes the system.

FIG. 2 shows a preferred embodiment of a turning conveyor 34 in diagrammatic form. The machine has an endless conveyor indicated schematically at 42. The conveyor extends around a head end pulley 44 and a tail end pulley 46. The head end pulley 44 is connected to a drive shaft 48. The drive shaft 48 is the output from a gear box 50. An external drive provides the input to the gear box 50 through a sprocket 52.

The endless conveyor 42 carries with it a plurality of carrier stations or flights, shown schematically at 54. The books are fed into the forward run of the endless conveyor at the tail end pulley 46. Each carrier station 54 has a clamp means which engages a book so that it is carried along the forward run of the turning conveyor. During the forward run the book is turned to the desired extent and released near the head end pulley to continue down the production line. The carrier stations proceed around the head end pulley to the return side of the endless conveyor. Details of this structure and operation will be explained below.

Figure 3:
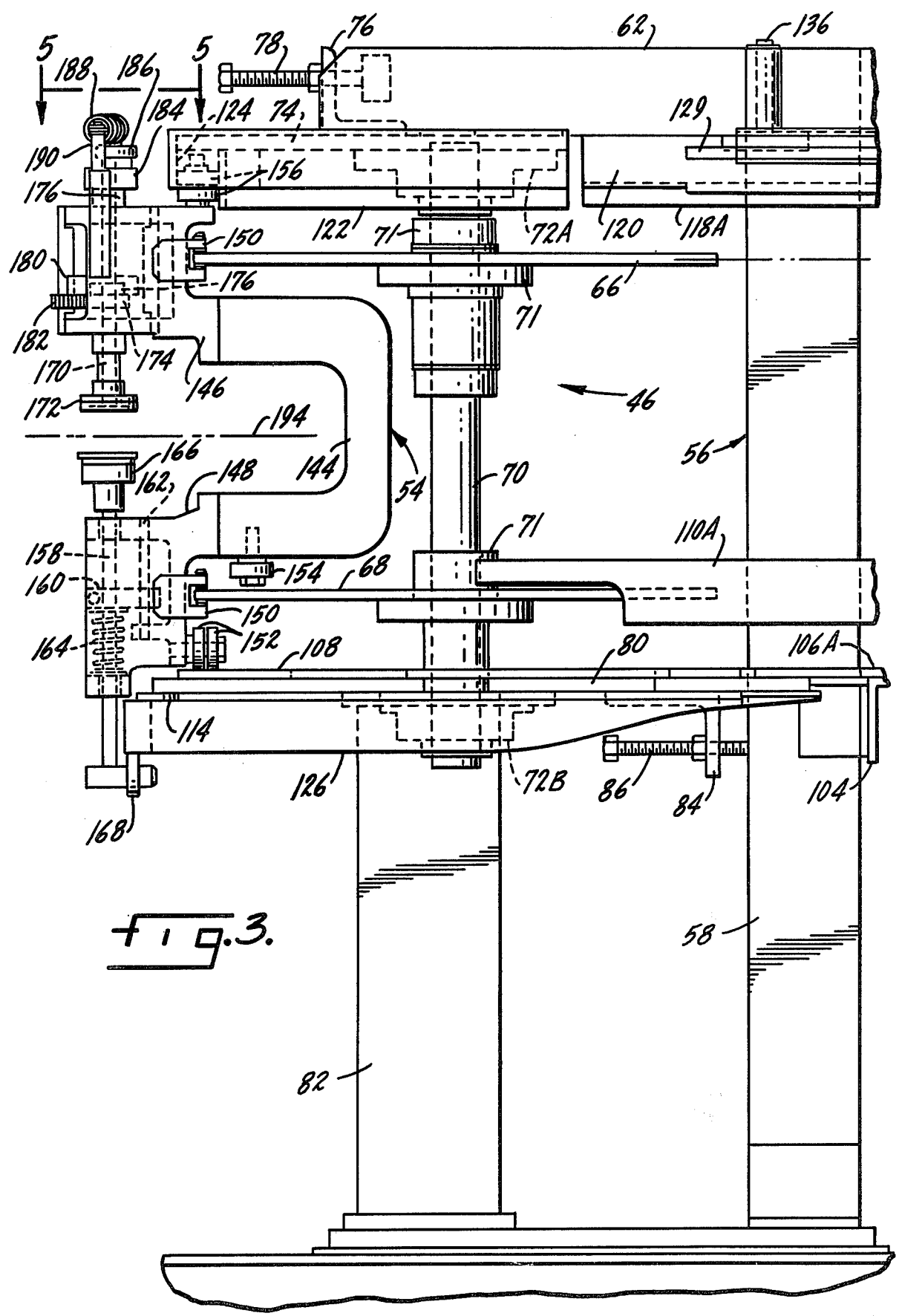
FIG. 3 is a side elevation view of a turning conveyor with a carrier station shown at the tail end pulley of the conveyor.

Structural details of a turning conveyor are shown in FIGS. 3 and 4. The turning conveyor has a frame 56. The frame has two main support columns 58 and 60, one of these being located near each end of the machine. A pair of longitudinal angle members or beams 62 and 64 connect the upright support columns 58 and 60.

In a preferred embodiment the endless conveyor comprises upper and lower roller chains and the head and tail pulleys include upper and lower sprockets. The tail pulley 46 is shown in FIG. 3. An upper tail sprocket 66 and a lower tail sprocket 68 are mounted on a common shaft 70. Appropriate collars and retainers 71 are used to hold the sprockets in place on the shaft. The ends of the shaft 70 are held by an upper bearing 72A and a lower bearing 72B. The upper bearing 72A is attached to an upper tail mounting plate 74. This plate is in turn bolted to the horizontal flanges of the main longitudinal beams 62 and 64. The bolt holes for this connection are slotted to provide for assembly and adjustment capability. An angle piece 76 is attached to the mounting plate 74 and engages an adjustment screw 78 so that the position of the mounting plate, and hence, the tension on the upper chain can be adjusted.

A similar structure is provided for the lower end of the shaft 70. The lower bearing 72B is attached to a lower tail mounting plate 80. The mounting plate 80 is supported by a pair of legs, one of which is shown at 82. The connection between the plate 80 and the legs 82 is slotted so that adjustment of the plate position can be made through the angle member 84 which is connected to the plate 80. An adjustment screw 86 operates in the same manner as adjustment screw 78 on the upper mounting plate.

The twin sprocket structure is also provided at the head end pulley 44 (see FIG. 4). The head pulley 44 comprises a shaft 88 supporting an upper head sprocket 90 and a lower head sprocket 92. The shaft is supported by upper and lower bearings 94A and 94B respectively. The upper bearing is connected to an upper mounting plate 96 which is in turn fastened to the longitudinal beams 62 and 64. The lower bearing 94B is connected to a lower mounting plate 98. The mounting plate 98 is supported by a pair of legs 100A and 100B. The head end pulley shaft 88 is connected by a coupler 102 to the drive shaft 48.

The frame also includes various channels, guides and tracks for supporting the carrier stations as they move around the turning conveyor. Looking first at the lower portion of the frame, two cross beams 104 are mounted to the upright columns 58 and 60. The cross beams support a longitudinal track 106A on the forward run side of the conveyor and a similar track 106B on the return side. A generally semi-circular end portion 108 is provided at each end of the machine to connect the two longitudinal tracks 106A and 106B. This forms a continuous track around the lower portion of the frame. In addition to the lower track 106 there is a pair of longitudinal runners 110A and 110B. These are supported by angle brackets 112A and 112B respectively. The brackets 112 are attached to the track members 106 which are in turn supported by the cross beams 104. The outside surface of the runners 110 provide a bearing surface for the lower chain, with chain guides (not shown) riding on the top edge of the runners. The inside surface of the runners provides a bearing for a lower horizontal roller on each carrier station. A plurality of rollers such as at 114 are provided on the lower side of each end of the machine. These assist in preventing binding of the carrier flights as they move around the generally semi-circular end portions.

An upper guide channel 116A is provided on the forward run side of the machine (FIG. 4). There is also a corresponding return sign channel 116B. These channels are formed by a pair of inside runners 118A and 118B, together with outside runners 120A and 120B. A pair of semi-circular end connectors 122 provide continuity between the inside runners 118A and 118B. Similar end connectors 124 are provided for the outer runners 120. The runners 118 and 120 are supported by a plurality of transverse support plates (not shown) which are bolted to the main longitudinal beams 62 and 64.

Several essential functions at the carrier flights or stations are controlled by several cams. A tail end clamp cam 126 is mounted underneath the lower tail mounting plate 80. A head end clamp cam 128 is provided in a similar location at the head end of the machine. The other cams are best seen in the schematic showing of FIG. 2. These include a gate cam 129, a turning cam 130, a reset cam 132 and a backup cam 133. The turning, backup and reset cams are supported on a plurality of cam support arms 134. The cam support arms are attached to the main longitudinal beams 62 and 64.

The gate cam 129 is pivoted at 136. A solenoid 138 is attached to one of the cam support arms and has a link 140 connected to gate cam 129. A spring (not shown) normally holds the gate cam 129 in an open position as shown in FIG. 2. Activating the solenoid causes the link 140 to pull the gate cam 129 to a closed position, which is the position shown in phantom at line 142. The operation and function of the various cams will be explained below.

A carrier station or flight is shown generally at 54 in FIG. 3. The carrier station has a frame comprising three main parts. There is a C-shaped central frame 144 which is rigidly connected to an upper frame 146 and a lower frame 148. There is a clevis 150 attached to each of the upper and lower frames. The clevises are pinned to the upper and lower chains so that the carrier station 54 moves around the turning conveyor with those chains.

The carrier station is supported by a plurality of rollers. These include a vertical roller 152 which rides on the lower track members 106 and 108. A lower horizontal roller 154 engages the inside surface of runners 110. A pair of upper horizontal rollers 156 run in the channel 116.

A clamp means is mounted in the lower frame portion 148 of the carrier station 54. The clamp means includes a clamp shaft 158 which is mounted for vertical and rotational movement in the lower frame 148. A reaction plate 160 is rigidly connected to the shaft 158 and is arranged to slide on a guide rod 162. A spring 164 positioned between the reaction plate and the bottom of the frame 148 urges the shaft 158 upwardly. At the top end of the shaft 158 is a lower clamp member 166. This member is bearing mounted so it can rotate. It has a face suitable for engaging a book without damaging it. The lower end of the shaft 158 carries a clamp cam follower 168. Whenever a carrier station is positioned above the lobe of one of the clamp cams 126 or 128 the cam follower 168 pulls the shaft 158 downwardly to open the clamp. When the carrier station leaves the areas of the cams 126 and 128 the spring 164 urges the clamp into a closed position.

The clamp means includes a turning shaft 170. The turning shaft is mounted in the upper frame 146, fixed in its vertical position but mounted for rotational motion. At the bottom of the turning shaft 170 is an upper clamp member 172. When the clamp means is closed on a book, the book is held fixed between the lower clamp member 166 and the upper clamp member 172. A pivot gear 174 is fixed to the turning shaft 170. The turning shaft is held in the upper frame 146 by bearings 176 (FIG. 5).

A turning means is mounted in the upper frame portion 146 of the carrier station. In addition to the pivot gear 174, the turning means also includes a pivot shaft 178 which is mounted for rotation in the frame 146. Near the bottom of pivot shaft 178 there is an attachment bar 180 affixed to the shaft such that the bar will rotate therewith. A segment gear 182 is connected to the attachment bar 180. A lever 184 is attached to the top of the pivot shaft 178. A turning cam follower 186 is mounted for rotation on pin 187 at one end of the lever 184. An over center spring 188 is also attached at pin 187. The other end of the over center spring 188 is held fixed on a peg 190 which extends from the frame 146. A pair of adjustable stops 192A and 192B restrict the rotation of the segment gear 182.

The use, operation and function of the invention are as follows:

A book cycle is defined as the time interval between successive books reaching a particular point in the conveyor system. The length of this time interval of course depends on the overall speed of the system. For example, a book is shown in FIG. 2 at stage 1 with its successor at the input stage. It will take one book cycle for the "input" book to reach stage 1. During that time the "stage 1" book will have moved on to stage 2, and so on. It will be understood that the conveyor moves continuously and the stages depicted in FIG. 2 are for illustrative purposes only. That is, at one instant per book cycle a series of books will actually be in the positions shown.

Books entering the turning conveyor are completed and ready for stacking except for the orientation of the backbones. The backbone location is designated in FIG. 2 by the letter B. The books are fed into the tail end of the turning conveyor at an input area which is so labeled in FIG. 2. The books are fed in series by suitable means which terminate at the input area of the turning conveyor 34 and here the carrier flights, which are synchronized to the arrival of books from the input conveyor (not shown), receive the books one by one in series.

As a carrier station moves around the tail pulley end of the turning conveyor the clamp cam follower 168 engages the tail clamp cam 126, causing the clamp shaft 158 and its associated clamp member 166 to move downwardly to the open position shown in FIG. 3. The book delivered from the input conveyor is fed in between the clamp members, along the book line 194 (FIG. 3). As the carrier station leaves the tail end pulley and enters the forward run of the conveyor, the cam follower 168 rolls off the lobe of cam 126. The clamp closes, engaging the book between the clamp members. Thus, by the time the book reaches stage 1 of FIG. 2, it is firmly in the grasp of the clamp means. The book is then carried down the forward run by the carrier station. At the head end pulley the clamp cam 128 opens the cam to release the book. The books are released at an output area, to be be picked up by an output conveyor.

The turning means operates during the four book cycles between stage 1 and stage 5. As a carrier station leaves stage 1 the turning means will be in the reset condition shown in FIG. 5, traveling in the direction of the arrow 196. In this condition, the over center spring 188 biases the lever 184 toward the inside of the conveyor, i.e., in a clockwise direction (as seen in FIG. 5) about pivot shaft 178. The stop 192A engages the segment gear 182 to hold the pivot shaft and lever in the reset position. When the carrier station moves past the closed gate cam 129, the follower 186 engages the gate cam and is gradually pushed in a counterclockwise direction. This causes lever 184 to turn the pivot shaft 178 and segment gear 182. The segment gear rotates the pivot gear 174 and turning shaft 170. The book held in the clamp turns with the turning shaft.

Somewhere in the vicinity of stage 2 the gate cam 129 pushes the follower 186 and spring 188 over center. The spring 188 then biases the lever 184 and pivot shaft 178 in a counterclockwise direction, as shown by arrows 198. The pivot shaft 178, segment gear 182, pivot gear 174 and turning shaft 170 continue to turn the book clockwise under the influence of the spring 188. Once the spring is pushed over center, rotation is controlled by the turning cam 130. The follower 186 rides out on the turning cam so that further rotation of the segment gear and turning shaft takes place gradually as the carrier station moves forwardly (see FIG. 2). The stop 192B engages the segment gear when the desired amount of rotation is achieved. In a preferred embodiment the cam configuration allows a book to turn 45° per book cycle. Thus at stage 2 the backbone is turned 45° from its orientation at stage 1. At stage 3 the backbone is turned 90°, at stage 4 135°, and at stage 5 a complete 180° turn has been accomplished. The clamp means then releases the book as described above while the carrier station proceeds around the head end pulley to the return side of the turning conveyor 34. Approximately midway on its run down the return side the cam follower 186 engages the reset cam 132. The reset cam pushes the lever 184 back over center toward its reset position as shown in FIG. 5. Once the lever is over center the cam follower 186 engages backup cam 133 which permits a gradual return to the reset position. The clamp will then be capable of turning the next book that it picks up.

To obtain the even stack desired, it is obvious that approximately half the books will need to be turned. So there will be reliance on some kind of sequence, such as every other or every five books being turned while the remaining books pass through the turning conveyor without being turned. The gate cam 129 allows this to be done. When the cam is open, the cam follower 186 is never pushed over center from the reset position. In that case the segment gear 182 will continue to be urged against stop 192A and no turning action will take place. The gate cam must be closed (by solenoid 138) when a carrier station passes to initiate a book turn. The turning sequence can be pre-set in the solenoid control or turning information can be printed on mailing labels or the like. This information would be read and fed to the solenoid for controlling the gate cam.

It can be seen that a complete 180° turn requires a particular book to move through stages 1 through 5. Thus the turning action occurs over a time interval of four book cycles. This relatively slow turning process allows the books to be turned with great reliability and without the risk of damaging the books. The books are further protected in that they are clamped at their center of gravity. This reduces the chances of damage. Also, there may be book support trays or tables which support the edges of the books as they are carried. The books remain relatively flat throughout the turning process.

FIG. 6 shows an alternate use of the invention. Instead of discharging the books near the head end pulley, the books are removed in the direction of arrow 200. This turns the books around a corner with the turning occurring over two book cycles. FIG. 7 shows another alternate discharge arrangement wherein the books are carried around a corner before being released. So if space limitations prevent the output from continuing in a straight line, a simple re-arrangement of the clamp cam 128 will allow the books to be carried around the corner as shown in FIG. 7. Also, the amount of turn can be adjusted by changing the position of stops 192 or the configuration of the cams.

Further, alternate use of the invention could be made in the type of system which gathers the so-called perfect bound books. In this type of binding the signatures do not straddle one another. Instead, they are laid flat one atop the next. The backbones then run past a gluing roller which applies glue and a cover is placed over the book. Most books are rectangular with a backbone along the longer side of the signature. Greater production can be obtained by arranging a book on a conveyor line such that the longer side of the book is perpendicular to the direction of travel. Then to move a book past a given point the book must be carried a distance equal to the shorter side rather than the longer side. But this will usually place the backbone perpendicular to the direction of travel. Since the gluing rollers will also be perpendicular to the direction of travel, the books are improperly oriented for gluing. This problem can be corrected by using the turning conveyer of the present invention to turn the books 90° prior to tilting the books up on their backbones for crossing the gluing rollers.

We claim:

1. In a system for gathering signatures into books, said system including a conveyor line for transporting the signatures during and after gathering, with one book following a preceding book by a time interval, and a stacking device at the end of the conveyor line, with the time interval between successive books reaching a particular point on the conveyor line defining a book cycle, an improved method of preparing completed books for stacking wherein selected books comprising about half the total number of books moving through the conveyor are turned 180° about an axis perpendicular to the plane of the books as they move along the conveyor line prior to entering the stacking device, while the remaining books are not turned as they move along the conveyor line, the turning of the books occurring over a time interval of at least two book cycles.

2. A machine for transporting a series of books which are fed into the machine at an input area and leave at an output area, comprising:
    a frame;
    drive means; an endless conveyor mounted on the frame and driven by the drive means to revolve around the frame;
    a plurality of carrier stations attached to the endless conveyor and movable therewith around the frame;
    clamp means mounted in each carrier station, arranged to close on each and every book at the input area, thereby to carry the clamped book through the machine, and open to release the book when the carrier station reaches the output area;
    turning means mounted in each carrier station, the turning means of each particular carrier station being selectively operable, independently of the turning means of the other carrier stations, as the carrier stations traverse from the input area to the output area so that the turning means of some carrier stations may operate while the turning means of other carrier stations do not operate as the carrier stations traverse from the input area to the output area, the turning means being effective when operable to rotate the clamp means through a predetermined arc after it engages a book, thereby turning the book relative to its direction of travel; and
    control means for selectively activating the turning means of each carrier station and effective to allow or disallow rotation of a clamped book by said turning means.

3. The structure of claim 2 wherein the turning means causes a book to be rotated 180°.

4. The structure of claim 2 wherein the input area and the output area are located such that the books leave the machine at an angle to the books entering the machine.

5. The structure of claim 2 wherein the frame includes head and tail pulleys and further comprising a first clamp opening cam mounted on the frame near the tail pulley and a second clamp opening cam mounted on the frame near the head pulley and wherein the clamp means comprises:
    a clamp shaft mounted for linear and rotational motion in the carrier station and having a first clamp member fixed to one end and a cam follower attached to the other end;
    a turning shaft mounted for rotational motion and having a second clamp member on one end in facing relation with the first clamp member;
    a closure spring which biases the clamp shaft toward the turning shaft to close the clamp, the first opening cam having a configuration which engages the cam follower when the carrier station approaches the input area so as to separate the clamp members briefly while a book is positioned between them, after which the clamp members close on the book until the carrier station reaches the output area where the cam follower engages the second clamp opening cam which separates the clamp members to release the book.

6. The structure of claim 5 wherein the endless conveyor is a roller chain and the head and tail pulleys are sprockets which engage a roller chain.

7. The structure of claim 2 further comprising a gate cam and a turning cam and wherein the turning means comprises:
 a pivot shaft mounted for rotational motion in the carrier station;
 a lever connected at one end to the pivot shaft and having a cam follower at the other end;
 a segment gear fastened to the pivot shaft;
 a pivot gear attached to the clamp means and engaging the segment gear such that it rotates therewith;
 first and second stops for limiting rotation of the segment gear; and
 an overcenter spring having one end held fixed to the carrier station and having an other end which is pinned to said other end of the lever such that the spring biases the segment gear against said first stop until the carrier station passes the gate cam, said cam selectively engaging the cam follower to push the lever and spring to a point where the spring biases the segment gear toward said second stop, causing the pivot shaft to rotate, which in turn causes the segment and pivot gear to rotate, the cam follower then riding out on the turning cam until the segment gear engages said second stop.

* * * * *